United States Patent [19]

Kobayashi

[11] Patent Number: 5,350,824
[45] Date of Patent: Sep. 27, 1994

[54] FLUOROSILICONE POLYMERS AND METHODS FOR THE PREPARATION THEREOF

[75] Inventor: Hideki Kobayashi, Chiba, Japan

[73] Assignee: Dow Corning Toray Silicone Co., Ltd., Tokyo, Japan

[21] Appl. No.: 79,657

[22] Filed: Jun. 18, 1993

[30] Foreign Application Priority Data

Jun. 29, 1992 [JP] Japan .................. 4-194880

[51] Int. Cl.$^5$ ............................... C08G 77/08
[52] U.S. Cl. ...................... 528/21; 528/23; 528/32; 528/42; 556/488
[58] Field of Search ........ 528/42, 23, 21, 32; 556/488

[56] References Cited

U.S. PATENT DOCUMENTS

| | | | |
|---|---|---|---|
| 3,070,617 | 12/1962 | Holbrook | 260/448.2 |
| 4,577,040 | 3/1986 | Kaufmann et al. | 556/462 |
| 5,028,679 | 7/1991 | Terae et al. | 528/23 |
| 5,233,005 | 8/1993 | Kobayashi | 556/488 |

OTHER PUBLICATIONS

Rochow, An Introduction to the Chemistry of the Silicones, John Wiley & Sons, Inc. New York, 1946, pp. 45, 49, 52 and 53.

*Primary Examiner*—Melvyn I. Marquis
*Attorney, Agent, or Firm*—Sharon K. Severance

[57] ABSTRACT

The instant invention pertains to novel fluorosilicone polymers that have a very low surface tension, excellent oil resistance, excellent heat resistance, and so forth.

The fluorosilicone polymers of the instant invention are fluorosilicone polymers comprised of siloxane unit with the following formula $$[F(CF_2)_aC_2H_4]_2SiO_{2/2} \qquad (a)$$

where a is an integer with a value of 1 to 10 and fluorosilicone polymers as represented by the following formula $$\{[F(CF_2)_aC_2H_4]_2SiO_{2/2}\}_x(R_2SiO_{2/2})_y \qquad (c)$$

wherein a is an integer with a value of 1 to 10, x is an integer with a value of at least 2, y is an integer with a value of at least 1, x>y, and R is a monovalent hydrocarbon group.

13 Claims, No Drawings

FLUOROSILICONE POLYMERS AND METHODS FOR THE PREPARATION THEREOF

BACKGROUND OF THE INVENTION

U.S. Pat. No. 3,070,617 discloses a cyclic trisiloxane comprised of the $(CF_3C_2H_4)_2SiO$ unit as well as a cyclic tetrasiloxane comprised of the $(CF_3C_2H_4)_2SiO$ unit. However, straight-chain polysiloxanes in which each silicon atom bears two $F(CF_2)_aC_2H_4$ groups where a is an integer with a value of 1 to 10 are not dislcosed. When the present experimented with the synthesis of fluorosilicone polymer from cyclic trisiloxane with the formula $(CF_3C_2H_4)_2SiO$ using conventional basic catalysts (e.g., potassium silanoate, sodium silanolate, lithium silanolate), a fluorosilicone polymer comprised of a siloxane unit with formula $$[F(CF_2)_aC_2H_4]_2SiO_{2/2} \quad (a)$$

where a is an integer with a value 1 to 10 was not obtained.

The present invention takes as its objects the introduction of novel fluorosilicone polymers and methods for the preparation thereof.

SUMMARY OF THE INVENTION

The present invention relates to novel fluorosilicone polymers and to methods for the preparation thereof.

In particular the present invention relates to a fluorosilicone polymer comprised of a siloxane unit with a formula $$[F(CF_2)_aC_2H_4]_2SiO_{2/2} \quad (a)$$

where a is an integer with a value of 1 to 10.

The present invention also relates to a method for preparation of this fluorosilicone polymer wherein said method comprises reacting zinc oxide and dichlorosilane with formula (b) in organic solvent $$[F(CF_2)_aC_2H_4]_2SiCl_2 \quad (b)$$

where a is an integer with a value of 1 to 10; stirring the resulting reaction mixture with water and protic acid to produce diorganopolysiloxane having the silanol group at both molecular chain terminals; and subjecting said diorganopolysiloxane to a condensation polymerization in the presence of an acidic condensation catalyst.

The present invention also relates to fluorosilicone polymer as represented by formula $$\{[F(CF_2)_aC_2H_4]_2SiO_{2/2}\}_x(R_2SiO_{2/2})_y \quad (c)$$

wherein a is an integer with a value of 1 to 10, x is an integer with a value of at least 2, y is an integer with a value of at least 1, x>y, and R is a monovalent hydrocarbon group.

The present invention further relates to a method for preparation of said fluorosilicone polymer wherein said method comprises reacting zinc oxide and dichlorosilane with formula (b) in organic solvent $$[F(CF_2)_aC_2H_4]_2SiCl_2 \quad (b)$$

where a is an integer with a value of 1 to 10; stirring the resulting reaction mixture with water and protic acid to produce diorganopolysiloxane having the silanol group at both molecular chain terminals; and subsequently implementing a chain extension by mixing a difunctional organosilane with formula $$R_2Si(NR^1-COCH_3)_2 \quad (d)$$

where $R^1$ is a monovalent hydrocarbon group into the diorganopolysiloxane.

THE INVENTION

The present invention relates to fluorosilicone polymer comprised of a siloxane unit with formula $$[F(CF_2)_aC_2H_4]_2SiO_{2/2} \quad (a)$$

where a is an integer with a value of 1 to 10.

The present invention also relates to a method for preparation of this fluorosilicone polymer wherein said method comprises reacting zinc oxide and dichlorosilane with formula (b) in organic solvent $$[F(CF_2)_aC_2H_4]_2SiCl_2 \quad (b)$$

where a is an integer with a value of 1 to 10; stirring the resulting reaction mixture with water and protic acid to produce diorganopolysiloxane having the silanol group at both molecular chain terminals; and subjecting said diorganopolysiloxane to a condensation polymerization in the presence of an acidic condensation catalyst.

The present invention also relates to fluorosilicone polymer as represented by formula $$\{[F(CF_2)_aC_2H_4]_2SiO_{2/2}\}_x(R_2SiO_{2/2})_y \quad (c)$$

wherein a is an integer with a value of 1 to 10, x is an integer with a value of at least 2, y is an integer with a value of at least 1, x>y, and R is a monovalent hydrocarbon group.

The present invention further relates to a method for preparation of said fluorosilicone polymer wherein said method comprises reacting zinc oxide and dichlorosilane with formula (b) in organic solvent $$[F(CF_2)_aC_2H_4]_2SiCl_2 \quad (b)$$

where a is an integer with a value of 1 to 10; stirring the resulting reaction mixture with water and protic acid to produce diorganopolysiloxane having the silanol group at both molecular chain terminals; and subsequently implementing a chain extension by mixing a difunctional organosilane with formula $$R_2Si(NR^1-COCH_3)_2 \quad (d)$$

where $R^1$ is a monovalent hydrocarbon group into the diorganopolysiloxane.

To explain the preceding in greater detail, one of the fluorosilicone polymers of the present invention comprises fluorosilicone polymer that is comprised of siloxane unit with formula (a)

$$[F(CF_2)_aC_2H_4]_2SiO_{2/2} \quad (a)$$

where a is an integer with a value of 1 to 10. The subscript a in the preceding formula is an integer with a value of at least 1 but no more than 10. This fluorosilicone polymer is exemplified by
fluorosilicone polymer comprised of siloxane unit with the formula $[F(CF_2)C_2H_4]_2SiO_{2/2}$, fluorosilicone polymer comprised of siloxane unit with the formula $[F(CF_2)_2C_2H_4]_2SiO_{2/2}$, fluorosilicone polymer comprised of siloxane unit with the formula $[F(CF_2)_4C_2H_4]_2SiO_{2/2}$, fluorosilicone polymer comprised of siloxane unit with the formula $[F(CF_2)_6C_2H_4]_2SiO_{2/2}$, fluorosilicone polymer comprised of siloxane unit with the formula $[F(CF_2)_8C_2H_4]_2SiO_{2/2}$, and fluorosilicone polymer comprised of siloxane unit with the formula $[F(CF_2)_4C_2H_4][F(CF_2)_8C_2H_4]SiO_{2/2}$.

In addition to siloxane unit with formula (a), the fluorosilicone polymer of the present invention may contain small quantities of other siloxane units, for example, the $RSiO_{3/2}$ unit where R is a monovalent hydrocarbon group and the $SiO_{4/2}$ unit.

This fluorosilicone polymer of the present invention is prepared by (I) reacting zinc oxide and dichlorosilane with formula (b) in organic solvent $$[F(CF_2)_aC_2H_4]_2SiCl_2 \tag{b}$$

where a is an integer with a value of 1 to 10; (II) stirring the resulting reaction mixture with water and protic acid to produce diorganopolysiloxane having the silanol group at both molecular chain terminals; and (III) subjecting said diorganopolysiloxane to a condensation polymerization in the presence of an acidic condensation catalyst.

The starting dichlorosilane with formula (b)

$$[F(CF_2)_aC_2H_4]_2SiCl_2 \tag{b}$$

where a is an integer with a value of 1 to 10 can be prepared, for example, by the following method. $HSiCl_3$ and $F(CF_2)_aCH=CH_2$ are first addition-reacted in the presence of hydrosilylation-reaction catalyst to give the trichlorosilane $F(CF_2)_aC_2H_4SiCl_3$ where a is as defined as above. A chlorine atom in this trichlorosilane is then reduced, and various reductants are effective for this reduction. For example, the dichlorosilane $[F(CF_2)_aC_2H_4]SiHCl_2$ where a is as defined as above may be obtained by running an exchange reaction using $(CH_3)_2SiHCl$ and tetrabutylammonium chloride. This product is then subjected to another addition reaction with $F(CF_2)_aCH=CH_2$ in the presence of hydrosilylation-reaction catalyst to yield the dichlorosilane $[F(CF_2)_aC_2H_4]_2SiCl_2$ where a is as defined as above. Another example of the synthesis of this type of dichlorosilane consists of the reaction of the Grignard reagent $F(CF_2)_aC_2H_4MgX$ where a is as defined as above, X is a halogen atom such as chlorine or bromine with $SiCl_4$ or $F(CF_2)_aC_2H_4SiCl_3$.

In order to prepare the fluorosilicone polymer of the present invention, zinc oxide is reacted in organic solvent with the dichlorosilane with formula (b)

$$[F(CF_2)_aC_2H_4]_2SiCl_2 \tag{b}$$

where a is an integer with a value of 1 to 10 prepared as described above. The resulting reaction mixture is then stirred with water and protic acid in order to produce silanol-terminated diorganopolysiloxane. The zinc oxide and dichlorosilane react in the organic solvent to afford the corresponding polysiloxane and zinc chloride as by-product. This reaction is generally run by heating under a reflux of the organic solvent. The zinc oxide is generally used at 0.4 to 5 moles zinc oxide per mole dichlorosilane (b), while 0.5 moles (equivalency) to 4.0 moles is preferred. No additional effect attaches to the use of more than 5 moles. The organic solvent used in the present invention is exemplified by acetonitrile and the alkyl acetates, and the latter are exemplified by methyl acetate, ethyl acetate, isopropyl acetate, n-propyl acetate, and isobutyl acetate. These organic solvents can be used in combination with other organic solvents, and the latter may be exemplified by ethers such as diethyl ether, tetrahydrofuran, and others; ketones such as methyl isobutyl ketone and others; halogenated hydrocarbons such as 1,1,1-trichloroethane, dichloroethane, alpha, alpha, alpha-trifluorotoluene, hexafluoroxylene, 1,1,2-trichlorotrifluoroethane, and others; and HCFC solvents such $CHCl_2CF_3$(HCFC123) and $CH_3CCl_2F$(HCFC141b). In particular, solvent that dissolves the alpha, omega-dihydroxyfluoroalkylmethylpolysiloxane product is preferred, for example, the halogenated hydrocarbons.

A silanol-terminated polysiloxane is subsequently produced by the addition of water and protic acid. The mixture separates into two layers with the silanol-terminated polysiloxane dissolved in the organic solvent layer, the zinc chloride by-product dissolved in the aqueous layer, and the excess zinc oxide also dissolved in the aqueous layer as zinc oxide. The organic layer is then repeatedly washed with water, recovered, and subjected to a water elimination. This water elimination is typically run by heating the organic solvent under reflux while using a water separation tube. The acidic condensation catalyst is exemplified by concentrated sulfuric acid, trifluoromethanesulfonic acid, dodecylbenzenesulfonic acid, and others. The equimolar mixture of 2-ethylhexanoic acid and tetramethylguanidine is also effective. This condensation reaction is run in the range from room temperature to 150° C. Trifluoromethanesulfonic acid is preferred because it catalyzes the condensation reaction at room temperature with almost no scission of the siloxane chain.

The other silicone polymer of the present invention comprises fluorosilicone polymer comprised of units represented by the following formula (c)

$$\{[F(CF_2)_aC_2H_4]_2SiO_{2/2}\}_x(R_2SiO_{2/2})_y \tag{c}$$

wherein a is an integer with a value of 1 to 10, x is an integer with a value of at least 2, y is an integer with a value of at least 1, $x>y$, and R is a monovalent hydrocarbon group. This fluorosilicone polymer is exemplified by fluorosilicone polymer comprised of units represented by the formula $\{[F(CF_2)C_2H_4]_2SiO_{2/2}\}_x[(CH_3)_2SiO_{2/2}]_y$, fluorosilicone polymer comprised of units represented by the formula $\{[F(CF_2)_2C_2H_4]_2SiO_{2/2}\}_x[(CH_3)_2SiO_{2/2}]_y$, fluorosilicone polymer comprised of units represented by the formula $\{[F(CF_2)_4C_2H_4]_2SiO_{2/2}\}_x[(CH_3)_2SiO_{2/2}]_y$, fluorosilicone polymer comprised of units represented by the formula $\{[F(CF_2)_6C_2H_4]_2SiO_{2/2}\}_x[(CH_3)_2SiO_{2/2}]_y$, fluorosilicone polymer comprised of units represented by the formula $\{[F(CF_2)_8C_2H_4]_2SiO_{2/2}\}_x[(CH_2=CH(CH_3)SiO_{2/2}]_y$, and fluorosilicone polymer comprised of units represented by the formula $\{[F(CF_2)_2C_2H_4][F(CF_2)_8C_2H_4]SiO_{2/2}\}_x[(CH_3)_2SiO_{2/2}]_y$.

This silicone polymer of the present invention is synthesized by (I) reacting zinc oxide and dichlorosilane with formula (b) in organic solvent

$$[F(CF_2)_aC_2H_4]_2SiCl_2 \qquad (b)$$

where a is an integer with a value of 1 to 10; (II) stirring the resulting reaction mixture with water and protic acid to produce diorganopolysiloxane having the silanol group at both molecular chain terminals; and (III) subsequently implementing a chain extension of this diorganopolysiloxane by the addition of difunctional organosilane as represented by formula (d).

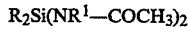
$$R_2Si(NR^1\text{---}COCH_3)_2 \qquad (d)$$

R in this formula represents monovalent hydrocarbon groups and may be exemplified by alkyl groups such as methyl, and ethyl; alkenyl groups such as vinyl, allyl, and 5-hexenyl; and the phenyl group. The groups R may be the same or different, and methylvinyl and dimethyl are preferred as the R groups. $R^1$ in the preceding formula also represents monovalent hydrocarbon groups and may be exemplified by alkyl groups such as methyl, ethyl, and phenyl. This difunctional organosilane may exemplified by methylvinylbis(N-methylacetamido)silane and dimethylbis(N-methylacetamido)silane.

The silanol-terminated diorganopolysiloxane under consideration is synthesized by the same method as described above. The reaction between the difunctional organosilane with formula (d) and this diorganopolysiloxane having the silanol group at both molecular chain terminals may be run by addition of the difunctional organosilane (d) to the dry organic solvent layer as described above or by addition of the difunctional organosilane after preliminary removal of the organic solvent. The silanol groups at the two molecular chain terminals of this diorganopolysiloxane immediately undergo a condensation reaction at room temperature simply upon addition of this difunctional organosilane with a resulting elongation of the siloxane chain. The condensation reaction will proceed at room temperature, but it may also be run by heating. While amide is produced as by-product in the condensation reaction under consideration, it is not a negative factor because it does not cut the polysiloxane chain. The amide by-product can be removed by stripping in vacuo.

The fluorosilicone polymer in accordance with the present invention as described hereinbefore has a low surface tension, excellent oil resistance, excellent heat resistance, and so forth. Accordingly, it is useful as a coating where such properties are critical. It is also useful as an additive for modifying the physical properties of synthetic rubbers and synthetic resins.

So that those skilled in the art can understand and appreciate the invention taught herein, the following examples are presented, being it understood that these examples should not be used to limit the scope of this invention found in the claims attached hereto. In the following examples "%" represents "weight %".

PREPARATION EXAMPLE 1

Synthesis of $(C_4F_9CH_2CH_2)_2SiCl_2$ 3 moles $C_4F_9CH\!\!=\!\!CH_2$ and 4.8 g isopropanolic chloroplatinic acid solution (concentration=10%) were placed in a flask and heated under reflux while stirring. 2.5 moles trichlorosilane was dripped in from an addition funnel over a period of 3 hours, and the reaction was then heated under reflux for another 5 hours. At this point, analysis by gas chromatography confirmed the disappearance of the $C_4F_9CH\!\!=\!\!CH_2$, and $C_4F_9CH_2CH_2SiCl_3$ was isolated by distillation at ambient pressure. The boiling point of this trichlorosilane was 162° C. 2 moles of this $C_4F_9CH_2CH_2SiCl_3$, 3.5 moles $Me_2SiHCl$, and 2.6 g tetra(n-butyl)ammonium chloride were placed in a flask and heated under reflux for 3 days while stirring. A mixture of chlorosilanes was then obtained by distillation in vacuo. Analysis by gas chromatography confirmed the main components of this reaction product to be $C_4F_9CH_2CH_2SiCl_3$, $C_4F_9CH_2CH_2SiHCl_2$, $Me_2SiHCl$, and $Me_2SiCl_2$. The $C_4F_9CH_2CH_2SiCl_3$ and $C_4F_9CH_2CH_2SiHCl_2$ fraction was separated by distillation in vacuo, and the $C_4F_9CH_2CH_2SiCl_3$ and $C_4F_9CH_2CH_2SiHCl_2$ mixture was introduced into a flask along with 5 g isopropanolic chloroplatinic acid solution (concentration=10%). This was heated to 80° C., and $C_4F_9CH\!\!=\!\!CH_2$ was added while stirring. This addition was discontinued when the peak for $C_4F_9CH_2CH_2SiHCl_2$ disappeared in gas chromatographic analysis. Precision distillation in vacuo then afforded $(C_4F_9CH_2CH_2)_2SiCl_2$ (bp=128° C./20 mmHg).

EXAMPLE 1

6 g zinc oxide, 25 g hexafluoroxylene, and 17 g ethyl acetate were placed in a flask and heated to give a solvent reflux. 30 g of the $(C_4F_9CH_2CH_2)_2SiCl_2$ synthesized as described in Preparation Example 1 was dripped in over 2 hours with stirring, and the reaction was subsequently heated and stirred for an additional 2 hours. After cooling, 100 g water was added, and 10% aqueous hydrochloric acid was then gradually added until the solids in the flask had disappeared. After disappearance of the solids, the system was allowed to stand, and an organic solvent layer and aqueous layer separated out. The organic solvent layer was taken off and washed with water to neutrality by the addition of water 3 times. The organic solvent was then stripped off in vacuo to give a polysiloxane (1). This polysiloxane (1) was subjected to analysis by gel permeation chromatography (GPC) using Freon 113 as solvent and polydimethylsiloxane as standard. Polysiloxane (1) was determined to be a mixture of 85% polymer with weight-average molecular weight $(M_w)=10,000$ and 15% oligomer with weight-average molecular weight $(M_w)=1,000$.

10 g of this polysiloxane (1) was placed in a flask and dissolved in 15 g Freon 113, and 2 g methylvinylbis(N-methylacetamido)silane was added while stirring. The solvent and N-methylacetamide by-product were subsequently removed by stripping in vacuo. The results from GPC analysis of the resulting fluorosilicone polymer demonstrated that the weight-average molecular weight (Mw) of the polymer component had increased to 100,000. It was also confirmed that this fluorosilicone polymer was a straight-chain fluorosilicone polymer comprised of the $(C_4H_9CH_2CH_2)_2SiO_{2/2}$ unit with minor entity of $CH_3CH\!\!=\!\!CHSiO_{2/2}$ unit.

EXAMPLE 2

Polysiloxane (1) was again prepared by the procedure described in Example 1. 10 g was placed in a flask and dissolved in 15 g Freon 113, and 3 microliters trifluoromethanesulfonic acid was added with mixing. The solvent was then removed by distillation in vacuo at 50° C., and a fluorosilicone polymer was obtained by mixing for an additional 1 day. According to the results from GPC analysis of this polymer, the $M_w$ of the polymer component had been increased to 50,000.

PREPARATION EXAMPLE 2

Synthesis of $(CF_3CH_2CH_2)_2SiCl_2$ 2 moles $CF_3CH_2CH_2SiCl_3$, 3.5 moles $Me_2SiHCl$, and 2.6 moles tetra(n-butyl)ammonium chloride were introduced into a flask and heated under reflux for 3 days with stirring. A mixture of chlorosilanes was then recovered by distillation in vacuo. According to analysis by gas chromatography, the main components of the reaction product were $CF_3CH_2CH_2SiCl_3$, $CF_3CH_2CH_2SiHCl_2$, $Me_2SiHCl$, and $Me_2SiCl_2$. The $CF_3CH_2CH_2SiCl_3$ and $CF_3CH_2CH_2SiHCl_2$ fraction was isolated by distillation in vacuo. The $CF_3CH_2CH_2SiCl_3$ and $CF_3CH_2CH_2SiHCl_2$ mixture was placed in a flask, 5 g isopropanolic chloroplatinic acid solution (concentration=10%) was added, and, while stirring and heating to 50° C., $CF_3CH=CH_2$ gas was then continuously injected through a glass tube inserted into the liquid. Its addition was halted when the peak for $CF_3CH_2CH_2SiHCl_2$ had disappeared in gas chromoatographic analysis. $(CF_3CH_2CH_2)_2SiCl_2$ (bp=128° C./20 mmHg) was then isolated by distillation in vacuo.

EXAMPLE 3

6 g zinc oxide, 25 g hexafluoroxylene, and 17 g ethyl acetate were placed in a flask and heated until a solvent reflux was established. 14.8 g of the $(CF_3CH_2CH_2)_2SiCl_2$ prepared in Preparation Example 2 was dripped in over 2 hours with stirring, and thereafter heating and stirring were continued for another 2 hours. After cooling, 100 g water was added, and 10% aqueous hydrochloric acid was then gradually added until the solids in the flask had disappeared. After disappearance of the solids, the system was allowed to stand, and an organic solvent layer and aqueous layer separated out. The organic solvent layer was taken off and washed with water to neutrality by the addition of water 3 times. The organic solvent was then stripped off in vacuo to give a polysiloxane (2). This polysiloxane (2) was subjected to analysis by gel permeation chromatography (GPC) using Freon 113 as solvent and polydimethylsiloxane as standard. Polysiloxane (2) was determined to be a mixture of 85% polymer with weight-average molecular weight (Mw)=20,000 and 15% oligomer with weight-average molecular weight (Mw)=1,000.

10 g of this polysiloxane (2) was placed in a flask, and 2 g methylvinylbis(N-methylacetamido)silane was added while stirring. The solvent and N-methylacetamide by-product were subsequently removed by stripping in vacuo. The results from GPC analysis of the resulting fluorosilicone polymer demonstrated that the weight-average molecular weight (Mw) of the polymer component had increased to 120,000. It was also confirmed that this fluorosilicone polymer was a straight-chain fluorosilicone polymer comprised of the $(CF_3CH_2CH_2)_2SiO_{2/2}$ unit.

What is claimed is:

1. A fluorosilicone polymer comprised of siloxane with formula $$[F(CF_2)_aC_2H_4]_2SiO_{2/2}$$

and having a silanol group at both molecular chain terminals;

where a is an integer with a value of 1 to 10.

2. A method for preparation of a fluorosilicone polymer wherein said method is comprises (I) reacting zinc oxide and dichlorosilane with the following formula (b) in organic solvent $$\{F(CF_2)_aC_2H_4\}_2SiCl_2 \qquad (b)$$

where a is an integer with a value of 1 to 10;

(II) stirring the resulting reaction mixture with water and protic acid to produce diorganopolysiloxane having a silanol group at both molecular chain terminals; and (III) subjecting said diorganopolysiloxane to a condensation polymerization in the presence of an acidic condensation catalyst.

3. A method a claimed in claim 2 wherein the organic solvent is selected from the group consisting of acetonitrile and alkyl acetates.

4. A method as claimed in claim 2 wherein the zinc oxide us used at 0.4 to 5 moles per mole of dichlorosilane (b).

5. A method as claimed in claim 2 wherein the acidic condensation catalyst is selected from the group consisting of concentrated sulfuric acid, trifluoromethanesulfonic acid, dodecylbenzenesulfonic acid, and an equimolar mixture of 2-ethylhexanoic acid and tetramethylguanidine.

6. A method as claimed in claim 5 wherein the condensation catalyst is trifluoromethanesulfonic acid.

7. A fluorosilicone polymer represented by formula (c)

$$\{[F(CF_2)_aC_2H_4]_2SiO_{2/2}\}_x(R_2SiO_{2/2})_y \qquad (c)$$

wherein a is an integer with a value of 1 to 10, x is an integer with a value of at least 2, y is an integer with a value of at least 1, x>y, and R is selected from a monovalent hydrocarbon group.

8. A fluorosilicone polymer as claimed in claim 7 wherein R is methyl.

9. A method for preparation of a fluorosilicone polymer wherein said method comprises (I) reacting zinc oxide and dichlorosilane with the following formula (b) in organic solvent $$\{F(CF_2)_aC_2H_4\}_2SiCl_2 \qquad (b)$$

where a is an integer with a value of 1 to 10;

(II) stirring the resulting reaction mixture with water and protic acid to produce diorganopolysiloxane having the silanol group at both molecular chain terminals; and (III) condensing the product of (II) with a difunctional organosilane as represented by formula $$R_2Si(NR^1\text{—}COCH_3)_2 \qquad (d)$$

where R and $R^1$ are selected independently from a monovalent hydrocarbon group into said diorganopolysiloxane.

10. A method a claimed in claim 9 wherein the organic solvent is selected from the group consisting of acetonitrile and alkyl acetates.

11. A method as claimed in claim 9 wherein the zinc oxide us used at 0.4 to 5 moles per mole of dichlorosilane (b).

12. A method as claimed in claim 9 wherein the difunctional organosilane (d) is methylvinylbis(N-methylacetamido)silane.

13. A method as claimed in claim 9 wherein the difunctional organosilane (d) is dimethylbis(N-methylacetamido)silane.

* * * * *